United States Patent Office 3,350,340
Patented Oct. 31, 1967

3,350,340
CHEMICALLY MODIFIED POLYMERS OF 1,2-ALKYLENIMINES AND A PROCESS FOR THEIR PRODUCTION
Uwe Soenksen, Ernst Bauer, and Walter Sanne, Ludwigshafen (Rhine), and Johannes Arnold, Einhausen, Hesse, Germany, assignors to Badische Anilin- & Soda-Fabrik Aktiengesellschaft, Ludwigshafen (Rhine), Germany
No Drawing. Filed Aug. 16, 1965, Ser. No. 480,192
Claims priority, application Germany, Aug. 21, 1964, B 78,206
9 Claims. (Cl. 260—29.6)

This invention relates to new water-soluble chemically modified polymers of 1,2-alkylenimines, and to a process for their production.

It is known that ethylenimine may be polymerized by means of acids or other substances which are capable of forming cations with ethylenimine (see for example U.S. patent specification No. 2,182,306 and Houben-Weyl, "Methoden der Organischen Chemie," 4th edition, 1958, volume 11/2, pages 259, et seq).

Moreover it is known from U.S. patent specification No. 2,626,931 that N-substituted ethylenimine derivatives, for example methyl β-ethyleniminopropionate which may be obtained from ethylenimine and methyl acrylate, can be polymerized. Some of the polymers are soluble and some of them are insoluble in water, depending on the initial materials.

It is also known from German patent specification No. 711,408 that polymer substances are obtained by reaction of monomeric or polymeric 1,2-alkylenimines wtih aliphatic or cyclic carboxylic acids or their anhydrides or esters. The said products are insoluble in water, however, and are accordingly unsuitable for many applications.

Water-soluble polymers of 1,2-alkylenimines, particularly of ethylenimine, and also chemically modified polymers of this type, have great technical importance, particularly in the paper industry. When added to fibrous stock, these agents effect, among other things, an increased freeness, an increased wet strength of the paper and an acceleration of the draining of the fibrous stock during sheet formation.

The last-mentioned of these effects has often been accompanied, when using the prior art agents, by the phenomenon that the transparency of the paper has become irregular, the irregularity being the more pronounced the greater the rate of draining.

The present invention therefore has for its object to prepare paper assistants having improved properties, particularly as regards increase in freeness and accelerating draining.

We have now found that water-soluble polymerization products of (a) 1,2-alkylenimines which have no substituents on the nitrogen atom and (b) α,β-unsaturated carboxylic acids or their acid chlorides, esters or anhydrides are obtained which are outstandingly suitable for paper manufacture when 1 mole of the 1,2-alkylenimine in solution in water or an organic solvent containing water is reacted with 0.001 to 0.5 mole, preferably 0.01 to 0.3 mole, of an α,β-unsaturated carboxylic acid or an acid chloride, ester or anhydride of such an acid, until the viscosity of a 1% by weight aqueous solution of the reaction product at 20° C. is at least 1.2 centipoises, preferably at least 1.5 centipoises.

We have furthermore found that particularly good results are achieved when the bulk, for example about 90%, of the α,β-unsaturated acid or said acid derivative is placed in water or a mixture of water and an organic solvent and then the 1,2-alkylenimine, dissolved in water, is allowed to flow in slowly at temperatures of from 70° to 100° C. or when the reactants are allowed to flow simultaneously into the water or solvent mixture which has been previously heated, and when the polymer thus obtained is thereafter allowed to react with the remainder of the α,β-unsaturated acid or acid derivative.

1,2-alkylenimines which bear no substituents on the nitrogen atom are suitable for the process, particularly ethylenimine and also its derivatives which bear methyl or ethyl groups as substituents on the carbon atoms and which have a total of not more than six carbon atoms. Examples of these are 1,2-propylenimine, 2,3-butylenimine and 1,2-butylenimine. Mixtures of these compounds may also be used.

The compounds for reaction with the 1,2-alkylenimines are quite generally monobasic or dibasic aliphatic, cycloaliphatic and araliphatic α,β-unsaturated carboxylic acids, their acid chlorides, esters and anhydrides (provided the acids are capable of forming the latter), and mixtures of the acids and/or their derivatives. These compounds may bear substituents, for example halogen atoms, carbamoyl groups, acetyl groups and cyano groups.

The anhydrides and esters are the most important and, of these, maleic anhydride and the lower esters (i.e., with one to six carbon atoms in the alcohol radical) of acrylic, methacrylic and maleic acid, such as the methyl and ethyl esters.

The following may be given as examples of other suitable compounds: acrylic acid, crotonic acid, ethyl cinnamate, heptene-1-carboxylic acid, hexahydrocinnamic acid, dimethyl butylidene malonate, dimethyl cyclohexylidene malonate, ethyl cyclophenylidene acetoacetate and ethyl benzalcyanoacetate. Mixtures of these compounds may also be used. Since all these compounds are able to form protons by reaction with water, the coemployment of additional polymerization initiators is in general unnecessary.

Water is particularly suitable as the reaction medium, and also mixtures of water with water-soluble organic liquids, such as methanol, ethanol, acetone, dioxane or dimethylformamide. The reaction may be carried out at temperatures of from 20° to 200° C., but the range of from 70° to 120° C. is usually preferred. If the temperature is higher than the boiling point of the solvent, the reaction is advantageously carried out at superatmospheric pressure.

When the product has reached the desired viscosity (which can be determined without difficulty by control experiments) the reaction mixture is allowed to cool to ambient temperature. No appreciable reaction normally takes place thereafter.

It has been observed that the properties of the product for paper technology are better the higher its viscosity is. It is necessary however to avoid entering a range of viscosity in which the viscosity rises suddenly as the reaction progresses, because in this range the products readily overstep the gel point and are liable to become insoluble in water.

The process according to this invention, which may be carried out continuously or batchwise, yields highly viscous colorless to yellowish solutions which may be used immediately, particularly as assistants in the manufacture of paper. These agents in particular give an increased rate of drain of the fibrous stock without impairing the uniformity of quality of the paper, and also an increase in freeness which is an improvement over the effect of conventional agents. This action has been observed in the case of all available types of fiber based on cellulose, for example bleached and particularly unbleached sulfite cellulose. The amounts required are from about 0.03 to about 0.15% by weight with reference to the fiber content of the paper pulp. In other respects, the products obtainable according to this invention may be used in the paper industry in the same way as conventional paper assistants of this type, for example polyethylenimine.

The invention will be further illustrated by the following examples in which parts and percentages are by weight. The viscosities are determined at 20° C. with a Hoeppler viscometer in centipoises.

*Example 1*

4128 parts of a 50% aqueous solution of ethylenimine and 48 parts of methyl acrylate are allowed to flow slowly and simultaneously into 240 parts of dimethylformamide at 80° C. during the course of two to three hours. The temperature gradually rises to 100° C. The reaction mixture is kept for another three hours at 100° C. and is then cooled to room temperature. The 48.1% homogeneous solution of the product has a viscosity of about 4000 centipoises.

By adding another 2 parts of methyl acrylate at 30° to 40° C. to 250 parts of the solution thus obtained and heating the mixture at 80° to 90° C. for another forty-five minutes, the viscosity of the solution is increased to 34,000 centipoises (1% solution: 1.5 centipoises). The product is outstandingly suitable as a paper assistant for increasing the rate of drain.

*Example 2*

4.5 parts of methyl acrylate is added at room temperature to 250 parts of the solution obtained according to the first paragraph of Example 1, the whole heated quickly to 80° to 90° C., the reaction mixture is kept at this temperature for one hour and then a total of 800 parts of water is introduced at such a rate that the highly viscous solution remains capable of being stirred well.

A 1% solution of this product has a viscosity of 2.3 centipoises.

The following table indicates to what extent the freeness of an unbleached sulfite cellulose is increased (i.e., the extent to which the degree of fineness measured according to Schopper-Riegler is decreased) by adding the product of the process according to the invention and commercially available polyethylenimine (in each case with reference to the solid material).

TABLE

|  | Fineness in ° SR after adding, percent— | | | | |
| --- | --- | --- | --- | --- | --- |
|  | 0.00 | 0.10 | 0.15 | 0.25 | 0.40 |
| Product of Example 2 | (63) | 58 | 53 | 36 | 28 |
| Commercial polyethylenimine | (63) | 62 | 55 | 41 | 33 |

Moreover it is noteworthy that the flocculating action of the product of the process according to this invention on the sulfite cellulose fibers in the process water and waste water of the paper machine is almost one and a half times as great as that of commercial polyethylenimine.

*Example 3*

313 parts of the solution obtained according to the first paragraph of Example 1 is heated with 687 parts of water and 60 parts of methyl acrylate to 80° C. and then kept for about an hour at 80° to 90° C. During this period the viscosity of the solution begins to rise very much, so that 2120 parts of water is added during the course of about three hours. The solution is then cooled.

A 1% solution of the product has a viscosity of 3.4 centipoises. It is eminently suitable as an assistant in the manufacture of paper.

*Example 4*

A solution prepared at 40° C. from 30 parts of dimethylformamide, 20 parts of methyl acrylate and 200 parts of a 25% aqueous solution of ethylenimine is heated to 80° to 90° C., polymerization of the reactants beginning very rapidly. About twenty minutes later, another 832 parts of the ethylenimine solution is added during the course of one and a half hours. The temperature is then kept at 85° to 90° C. for another two hours and the whole is then cooled.

A 1% solution of the product has a viscosity of 1.2 centipoises. It is well suited for increasing freeness in paper manufacture.

*Example 5*

1032 parts of 50% aqueous ethylenimine is added gradually to a mixture of 60 parts of dimethylformamide and 5 parts of maleic anhydride during the course of one and a half hours and the temperature is raised to 90° C. The reaction mixture is kept for another three hours at 90° to 100° C. and is then cooled to room temperature.

A 1% solution of the product has a viscosity of 1.2 centipoises; it is suitable as a paper assistant.

We claim:

1. A process for the production of water-soluble polymerization products from (a) a 1,2-alkylenimine which is free from substituents on the nitrogen atom and (b) a component selected from the group consisting of α,β-unsaturated carboxylic acids, acid chlorides, esters and anhydrides, wherein 1 mole of component (a) in a solvent which consists at least partly of water is reacted with 0.001 to 0.5 mole of component (b) until the viscosity of a 1% by weight aqueous solution of the product at 20° C. is at least 1.2 centipoises.

2. A process as claimed in claim 1 wherein 1 mole of component (a) is reacted with 0.01 to 0.3 mole of component (b).

3. A process as claimed in claim 1 wherein the reaction is continued until the viscosity of a 1% by weight solution of the product at 20° C. is at least 1.5 centipoises.

4. A process as claimed in claim 1 wherein component (b) is placed in a solvent consisting at least partly of water and component (a) dissolved in water is allowed to flow in at a temperature of from 70° to 100° C.

5. A process as claimed in claim 1 wherein components (a) and (b) are allowed to flow simultaneously into a preheated solvent consisting at least partly of water.

6. A process as claimed in claim 1 wherein the polymerization is carried out with component (a) and the bulk of component (b) and then the product is allowed to react with the remainder of component (b).

7. A process as claimed in claim 1 wherein component (a) is ethylenimine.

8. A process as claimed in claim 1 wherein component (b) is selected from the group consisting of lower esters of acrylic, methacrylic and maleic acid and maleic anhydride.

9. Water-soluble polymerization products of (a) a 1,2-alkylenimine which is free from substituents on the nitrogen atom and (b) a component selected from the group consisting of α,β-unsaturated carboxylic acids, acid chlorides, esters and anhydrides, prepared as claimed in claim 1.

References Cited

UNITED STATES PATENTS 2,626,931   1/1953   Bestian _____ 260—78.4
3,223,681   12/1965   Rambosek _____ 260—78.4

FOREIGN PATENTS 711,408   10/1941   Germany.

SAMUEL H. BLECH, *Primary Examiner.*

MURRAY TILLMAN, *Examiner.*

W. J. BRIGGS, SR., *Assistant Examiner.*